United States Patent [19]

Shimada et al.

[11] Patent Number: 5,574,211
[45] Date of Patent: Nov. 12, 1996

[54] DETECTOR HAVING SELF-CALIBRATION FUNCTION

[75] Inventors: Satoshi Shimada, Hitachi; Seiko Suzuki, Hitachiota; Shigeki Tsuchitani, Mito; Seiichi Ugai, Hitachi; Masayoshi Kaneyasu, Hitachi; Hiroshi Kuroiwa, Hitachi; Yoshihiro Yokota, Katsuta, all of Japan

[73] Assignee: Hitachi, Ltd., Tokyo, Japan

[21] Appl. No.: 452,698

[22] Filed: May 30, 1995

Related U.S. Application Data

[63] Continuation of Ser. No. 339,709, Nov. 14, 1994, Pat. No. 5,429,736, which is a continuation of Ser. No. 985,654, Dec. 7, 1992, Pat. No. 5,391,283, which is a continuation of Ser. No. 595,824, Oct. 10, 1990, Pat. No. 5,174,884.

[30] Foreign Application Priority Data

Oct. 20, 1989 [JP] Japan .................................. 1-271666

[51] Int. Cl.[6] ..................................... G01P 15/00
[52] U.S. Cl. .................. 73/1 D; 73/514.21; 73/514.18
[58] Field of Search ........................ 73/514.18, 514.16, 73/514.32, 514.33, 514.34, 510, 511, 1 D, 514.21; 204/406, 425, 426, 153.1

[56] References Cited

U.S. PATENT DOCUMENTS

| | | | |
|---|---|---|---|
| 4,225,851 | 9/1980 | Reschovsky et al. | 340/177 |
| 4,337,746 | 7/1982 | Masaki | 204/427 |
| 4,556,472 | 12/1985 | Langdon | 204/406 |
| 4,638,669 | 1/1987 | Chou | 73/517 R |
| 4,673,870 | 6/1987 | Strickland et al. | 324/74 |
| 4,702,816 | 10/1987 | Hashimoto et al. | 204/425 |
| 4,844,788 | 7/1989 | Takahashi et al. | 204/406 |
| 5,095,752 | 3/1992 | Suzuki et al. | 73/517 R |
| 5,103,667 | 4/1992 | Allen et al. | 73/514.18 |
| 5,163,325 | 11/1992 | White et al. | 73/514.18 |
| 5,174,884 | 12/1992 | Shimida et al. | 204/406 |

FOREIGN PATENT DOCUMENTS

| | | |
|---|---|---|
| 0194953 | 9/1986 | European Pat. Off. . |
| 0254142 | 1/1988 | European Pat. Off. . |
| 0368446 | 5/1990 | European Pat. Off. . |
| 3542397 | 6/1987 | Germany . |
| 61-31952 | 2/1986 | Japan . |
| 61-212753 | 9/1986 | Japan . |
| 2178856 | 2/1987 | United Kingdom . |
| 88/01242 | 2/1988 | WIPO . |
| 89/03019 | 4/1989 | WIPO . |

*Primary Examiner*—Bruce F. Bell
*Attorney, Agent, or Firm*—Antonelli, Terry, Stout & Kraus

[57] ABSTRACT

A detector for detecting a physical quantity as a quantity of electricity has a detection portion, a portion for stimulating the detection portion and a signal processing portion, wherein a calibration signal is supplied from the signal processing portion to the detection portion via the stimulating portion so as to measure a specific response of the detection portion, whereby self-calibration and correction of the characteristic of the detector are performed in accordance with an amount of a change in the response.

16 Claims, 12 Drawing Sheets

DETECTOR HAVING SELF-CALIBRATION FUNCTION

CROSS-REFERENCE TO RELATED APPLICATIONS

This application is a continuation of application Ser. No. 08/339,709 filed on Nov. 14, 1994, now U.S. Pat. No. 5,429,736, which is a continuation of application Ser. No. 07/985,654 filed on Dec. 7, 1992, now U.S. Pat. No. 5,391,283, which is a continuation of application Ser. No. 07/595,824 filed on Oct. 10, 1990, now U.S. Pat. No. 5,174,884.

BACKGROUND OF THE INVENTION

1. Field of the Invention

The present invention relates to a detector for detecting a physical quantity from a value of an electric signal converted from the physical quantity, and, more particularly, to a detector having a self-calibration function and a characteristic corrective function.

2. Related Art Statement

Hitherto, a conventional detector has been, as disclosed in, for example, Japanese Patent Unexamined Publication No. 61-31952, arranged in such a manner that the measuring operation is stopped so as to start a calibrating operation which is performed as an offline operation. Furthermore, there has been disclosed, in Japanese Patent Unexamined Publication No. 61-212753, an apparatus capable of diagnosing deterioration by analyzing the characteristics observed in the detector. However, the apparatus of this type also performs, as an offline operation, the operation for diagnosing the deterioration.

The conventional calibration has been realized for the purpose of automating the offline operation. Furthermore, there has been a proposal that the reliability of a detector is improved by observing the line and giving an alarm if necessary as an online operation. However, since no measure has been taken for performing the calibration as an online operation, a problem takes place that the measurement is stopped for a relatively long time in comparison with the time in which the value of the measurement can be changed.

SUMMARY OF THE INVENTION

An object of the present invention is to provide a detector capable of performing a self-calibration as an online operation.

Another object of the present invention is to provide a detector system which can subject a significantly wide portion or a multiplicity of portions to calibration and correction from a remote position and which can be easily maintained and safely operated.

A still further object of the present invention is to provide a compact detector which is provided with self-calibration and corrective functions and which can be easily manufactured.

In order to achieve the above-described objects, the calibration or the corrective operation must be completed in a significantly short time in comparison with the time in which the value of the measurement can be changed. The reason for this lies in that the data of the measurement must be protected from a disorder or an error due to the calibration or the corrective operation performed during the measurement operation. As for the device for processing an electric signal, significantly high speed semiconductor ICs are available recently due to the progress of the LSI technology. Therefore, the thus realized speed of processing the electric signal can cope with the time of several tens to 100 μs which is the value necessary to conduct measurements in an automobile in which the values to be measured are varied in a relatively short time. Therefore, an unsolved problem is to shorten the time taken to operate the detection means. Accordingly, the present invention employs stimulating means disposed adjacent to the detection means so as to stimulate and operate the detection means. A structure can be realized in which a small sensor or detector, the size of which is, for example, several hundreds of μm, and an actuator, that is, the stimulating device, can be integrally formed by utilizing the micromachining technology for silicon or the like which has been remarkably progressed recently. Therefore, a compact and integrally formed stimulating device is able to apply a calibration signal, as a stimulation, to the detector without delay.

In order to achieve another object of the invention, it is necessary to supply an accurate calibration signal to the detector and to correctly measure the response of the detector. Therefore, according to an embodiment of the present invention, a structure is employed in which a calibration signal is supplied to the detector by a signal processing circuit including an accurate and high resolution analog-to-digital converter. Then, a responding electric signal which is inherent to the detector is then processed. Furthermore, a suitable self-calibration algorithm is accurately and quickly performed by a microcomputer.

In order to achieve another object of the invention, a structure is employed according to an embodiment of the present invention, in which the processing device is provided with a communication function, the self-calibration and characteristic correction are instructed from a remote position by another communication device and the result of the self-calibration and the characteristic correction are confirmed.

The detector according to the present invention is preferably structured such that the stimulating means is formed adjacent to and integrally with the detection means so that the calibration signal can be supplied through the stimulating means. Therefore, a delay in response from the detector can be significantly prevented. Furthermore, a high-speed signal processing circuit can be employed to shorten the time required for completing the self-calibration in comparison to the time in which the values to be measured are changed. Therefore, even if the self-calibration is performed during the measurement operation, the output from the detector can be protected from disorder. Therefore, a so-called "online calibration" can be realized.

Furthermore, the characteristic obtained during operation is always corrected in accordance with a comparison made with the initial characteristic of the detector based on a calibration and corrective algorithm previously prepared in the processing means. Therefore, the initial performance can be maintained to significantly improve the reliability.

Other and further objects, features and advantages of the invention will be made more apparent by the following description.

DETAILED DESCRIPTION OF PREFERRED EMBODIMENTS

Figure 1:
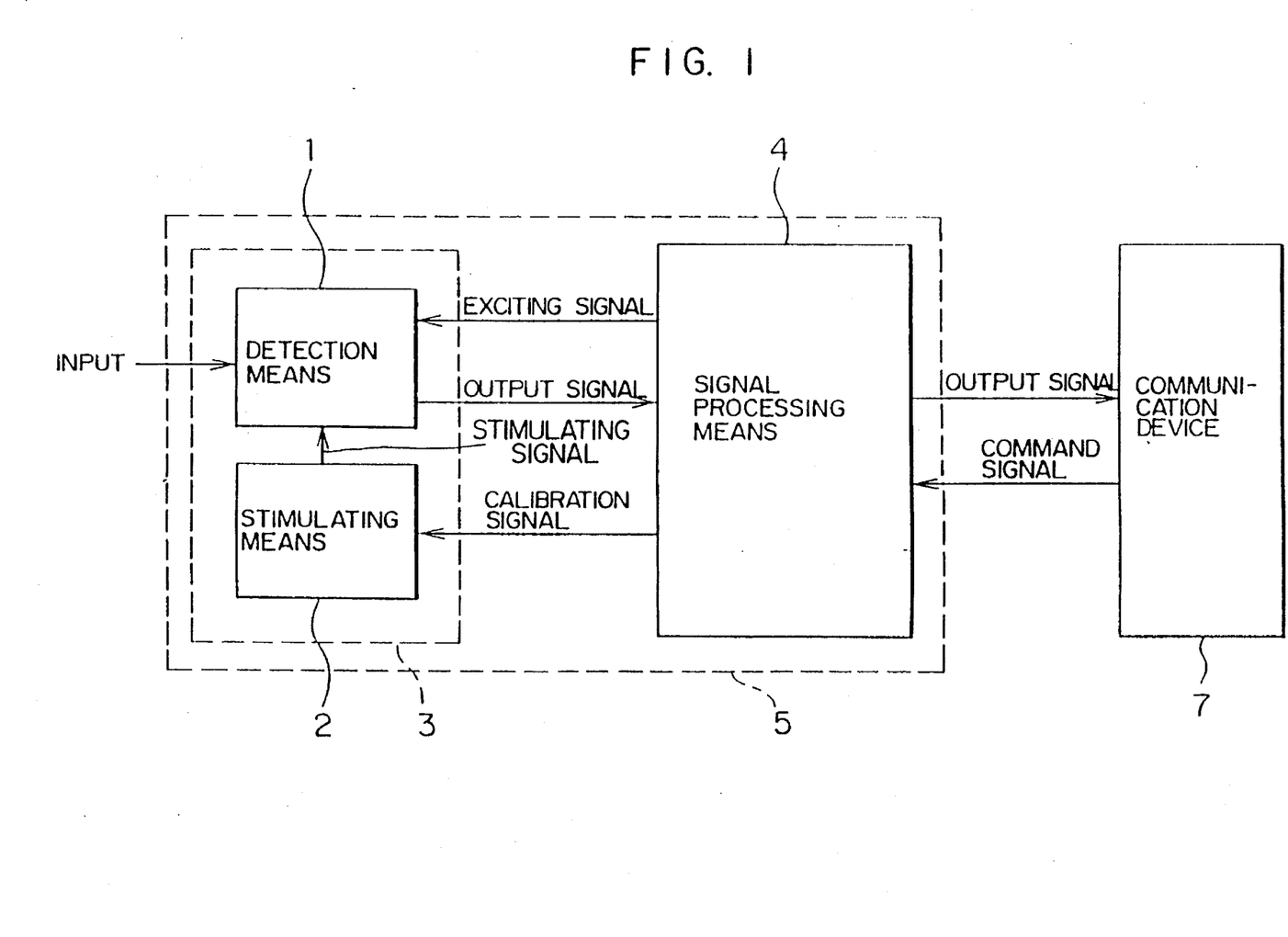
FIG. 1 illustrates the basic structure of an embodiment of the present invention.
Figure 2:
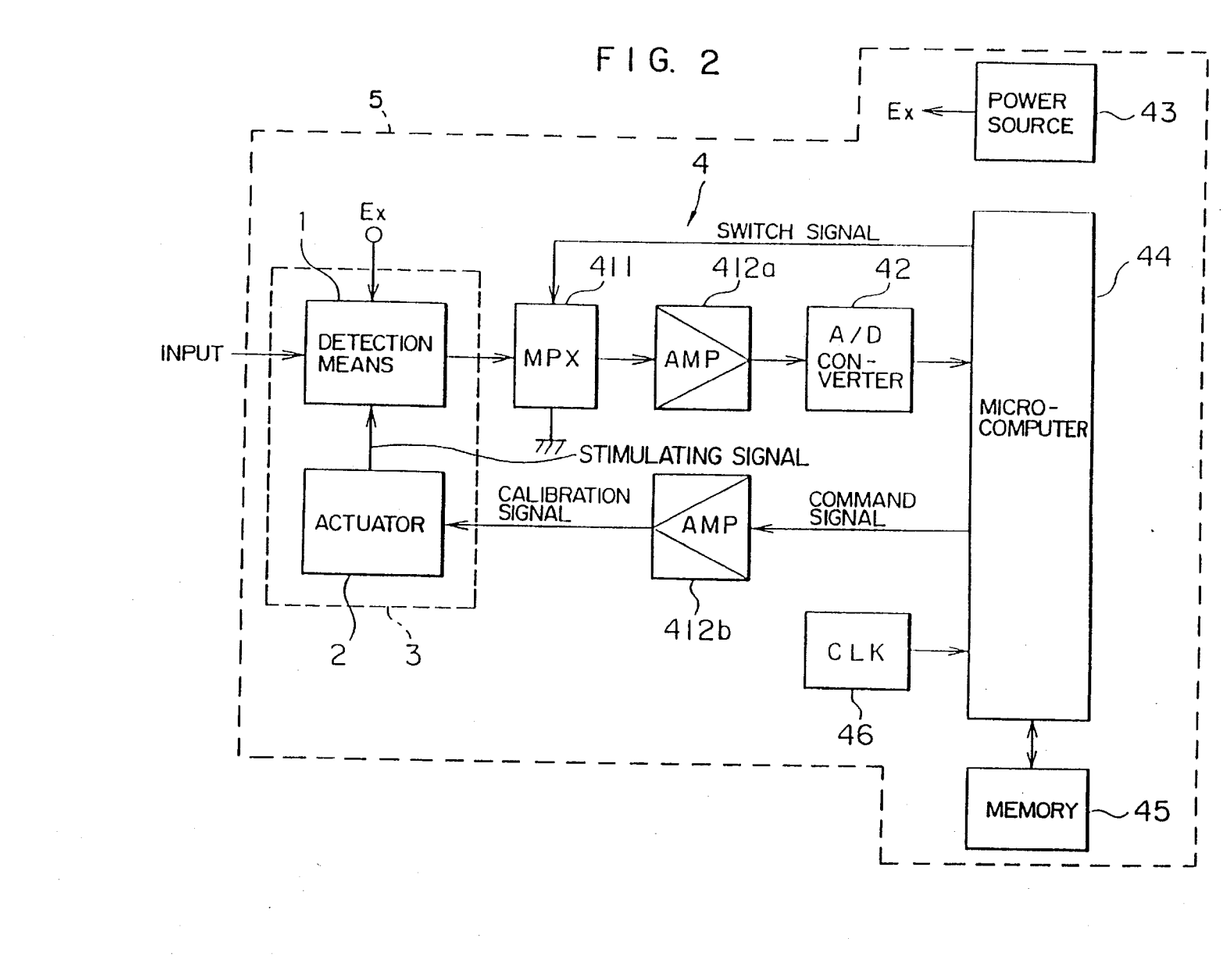
FIG. 2 is a circuit diagram for a signal processing means.

Referring to FIGS. 1 and 2, the basic structure of an embodiment of the present invention will be described. Reference numeral 1 represents detection means and 2 represents stimulating means disposed adjacent to the detection means 2 and formed integrally therewith. Reference numeral 3 represents an assembly of the detection means 1 and the stimulating means 2. Reference numeral 4, as shown in FIG. 1 represents a signal processing means structured as shown in FIG. 2 and arranged to supply a power supply voltage Ex for operating the detection means 1 and the stimulating means 2 and to process a calibration signal to be supplied to the stimulating means 2. Furthermore, the signal processing means 4 has a so-called "signal adjustment function" capable of amplifying/converting a responding output signal from the detection means 1, as shown in FIGS. 1 and 2. In addition, the signal processing means 4 has a function of calibrating the input/output and a characteristic corrective function realized by digital-data processing performed by a microcomputer 44, as shown in FIG. 2. Reference numeral 5, as shown in FIG. 1, represents a detector including the above-described elements. Usually, the detector converts an input physical quantity such as a pressure, a discharge and an acceleration into a digital quantity of a certain number of bits and outputs the digital quantity. Reference numeral 7, as shown in FIG. 1, represents a communication device capable of transmitting/receiving a command signal and an output signal to and from the signal processing means 4, the communication device 7 further having a function of displaying the command signal and the output signal.

FIG. 2 illustrates the specific structure of a circuit serving as the signal processing means 4. In response to a command issued from the microprocessor 44 having a memory 45, a multiplexer 411 is operated so as to cause the output signal transmitted from the detection means 1 to be received by an amplifier 412a and an analog-to-digital converter 42. As a result, the output signal thus received is converted into a digital signal. In accordance with the value represented by the digital signal, the signal processing means 4 supplies the power supply voltage Ex or supplies the calibration signal to the stimulating means 2 via another amplifier 412b. As a result, an accurate detection signal capable of correcting an error can be obtained.

Then, the principle of a range calibration operation will be described with reference to an electrostatic capacity type pressure sensor so as to specifically describe the invention.

Figure 3:
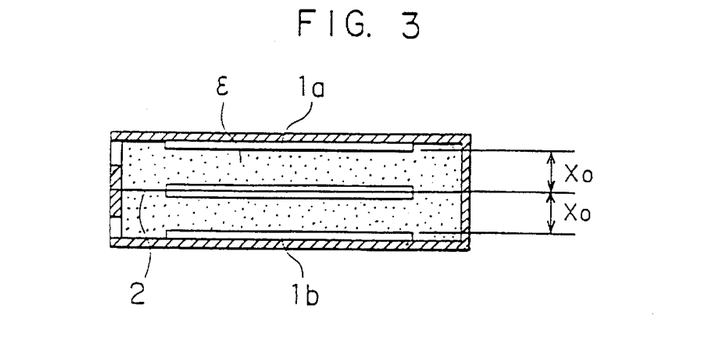
FIGS. 3 to 6 illustrate the operation of an electrostatic capacity type pressure sensor.

As shown in FIG. 3, the electrostatic capacity type pressure sensor is constituted in such a manner that an electrode plate 2, which can be displaced by a differential pressure $\Delta P$, is disposed between electrode plates $1a$ and $1b$ each of which has an area A. The distance between each pair of the electrode plates is $X_0$ under no differential pressure. Furthermore, each of the spaces between the electrodes is filled with a substance having a dielectric constant $\epsilon$.

Figure 4:
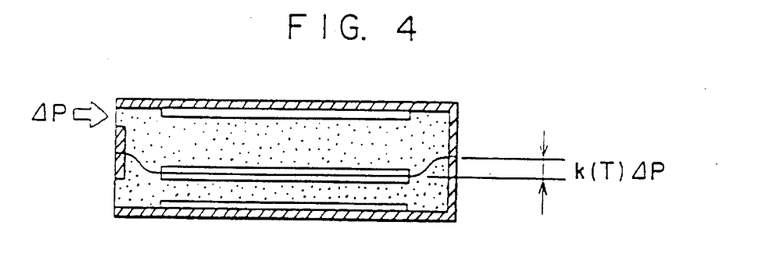

When the differential pressure $\Delta P$ is applied, the intermediate electrode is, as shown in FIG. 4, displaced by $\Delta X$. Since the displacement is substantially in proportion to the differential pressure, the relationship expressed by ($\Delta X = k \cdot \Delta P$) holds, where the symbol k denotes a compliance (the reciprocal of the spring constant).

Assuming that k is varied as the time proceeds, it can be expressed as a function of time T, that is, k(T). As a result of the above-described displacement of the intermediate electrode plate 2, there is generated a capacity difference $\Delta C$ between capacities $C_1$ and $C_2$, where the capacity $C_1$ is the capacity between the electrodes $1a$ and 2 and the capacity $C_2$ is the capacity between the electrodes 2 and $1b$.

Figure 5:
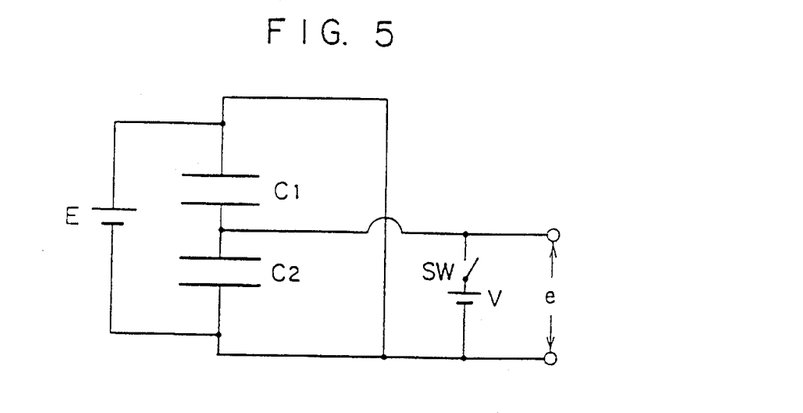

As a result of the arrangement of a circuit shown in FIG. 5, the capacity difference $\Delta C$ due to the differential pressure can be detected by the following equation:

$$e = \frac{\Delta C}{C_1 + C_2} E \qquad (1)$$

where the symbol E denotes an excitation voltage, e denotes a voltage to be detected and $\Delta C$ stands for $C_2 - C_1$. As an alternative to this, the voltage can be expressed by the loaded differential pressure $\Delta P$ as follows:

$$e = \frac{k(T)}{X_0} \Delta P E \qquad (2)$$

As can be seen from the above-described equation (2) a detected voltage $e_{max}$, that is, the output span under the maximum differential pressure $\Delta P_{max}$, is changed as the time proceeds if the compliance k is changed as time proceeds.

A calibrating voltage V is applied to the intermediate electrode so as to generate a displacement $\Delta xv$ due to the electrostatic force, so that the output voltage e generated at this time is measured for the purpose of calibrating the above-described range change based on the relationships thus obtained.

First, the calibrating voltage V shown in FIG. 5 is selected in a manner expressed by the following Equation (3):

$$V = E/2 + v \qquad (3)$$

Figure 6:
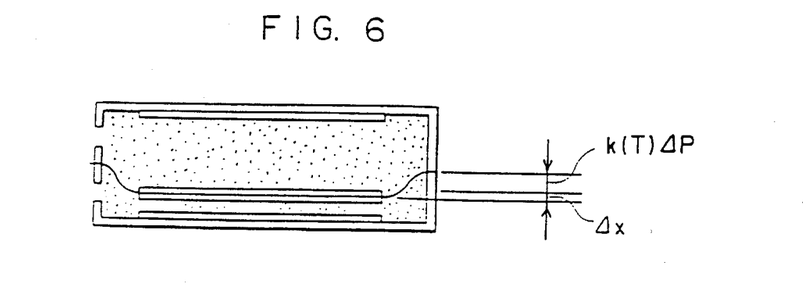

However, assuming that ($v \ll E/2$), the displacement due to the voltage V is of a value expressed by $\Delta x$ shown in FIG. 6 and given by the following Equation 4:

$$\Delta xv = \frac{\epsilon^2 A^3}{X_0^2} k(T) E \cdot v \qquad (4)$$

The output voltage e at this time is of a level given by the following equation:

$$e = \left[ \frac{k(T)}{X_0} \Delta P + \frac{\epsilon^2 A^3}{X_0^3} k(T) E \cdot v \right] \cdot E \qquad (5)$$

Therefore, since k(T) can be known by varying V, the range can be calibrated.

Now, the procedure will be described.

It is defined that the outputs are $e_1$ and $e_2$ when calibrating voltages $V_1$ and $V_2$ are applied. In order to delete from Equation (5) the term which depends upon the pressure, the following calculation is performed:

$$\Delta e = e_1 - e_2$$
$$= \frac{\epsilon^2 A^3}{X_0^3} k(T) E^2 (V_1 - V_2)$$

Then, the ratio of $\Delta e$ and $\Delta e$ with the initial T being 0 is given as follows:

$$d \equiv \frac{\Delta e(T=0)}{\Delta e(T)} = \frac{k(T=0)}{k(T)}$$

By using a calibration coefficient d thus obtained, a calibration voltage $\tilde{e}$ can be obtained from the following equation:

$$\tilde{e} = d \cdot e \quad \text{(where } v=0\text{)}.$$

Figures 7A, 7B:
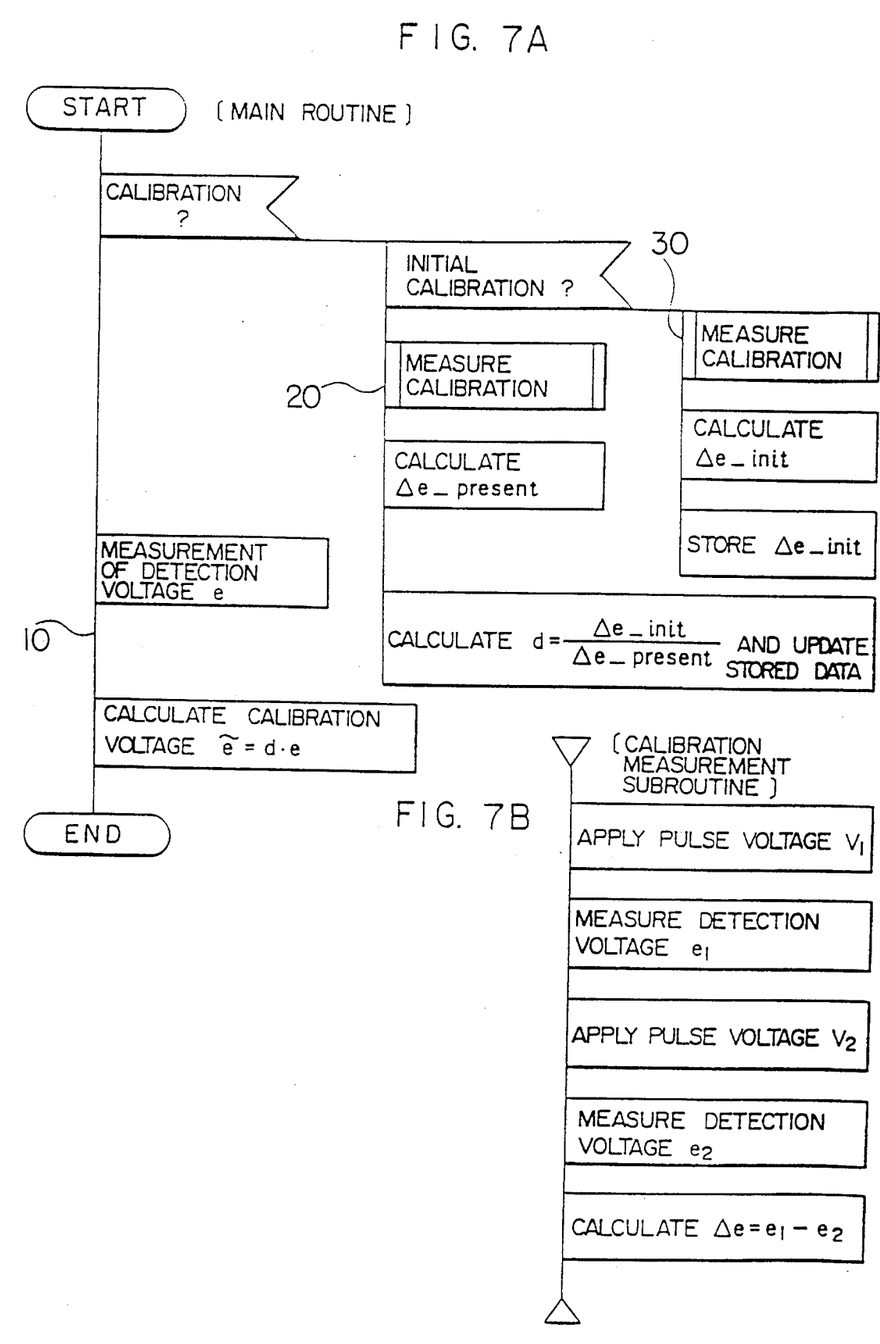
FIGS. 7A and 7B are flow charts of the operation of a microcomputer.

FIGS. 7A and 7B illustrate flow charts for a process to be performed in the microcomputer. FIG. 7A illustrates the main routine in which the ordinary measurement work flows along a route 10. In the route 10, the detection voltage e at (v=0) in Equation (5) is measured so as to obtain the calibration voltage $\tilde{e}$ by multiplying the detection voltage e by the calibration coefficient d. As a result, the calibration voltage $\tilde{e}$, which is the final detected value, is obtained. The above-described calibration coefficient d is calculated in a route 20. The program for the microcomputer is provided with a calibration measurement subroutine shown in FIG. 7B, in which the differential value $\Delta e$ between the detection voltages $e_1$ and $e_2$ is calculated, the detection voltages $e_1$ and $e_2$ being obtained from measurements in which the calibrating pulse voltages $V_1$ and $V_2$ are applied.

The calibration includes an initial calibration and an optional calibration. The initial calibration is performed at the delivery of the product from a manufacturing plant and conducted such that an initial differential value ($\Delta e$-init) is calculated and stored by the process of a route 30. The route 20 is performed as the optional calibration in which a present differential value ($\Delta e$-present) is calculated so as to obtain the calibration coefficient d which is the ratio to $\Delta e$-init and $\Delta e$-present. The calibration coefficient d thus obtained is stored so as to update the previous value.

As described above, the pressure, the sensitivity drift of which is corrected by the calibration voltage $\tilde{e}$ obtained by multiplying the detection voltage e by the calibration coefficient d, can be obtained.

Figure 8:
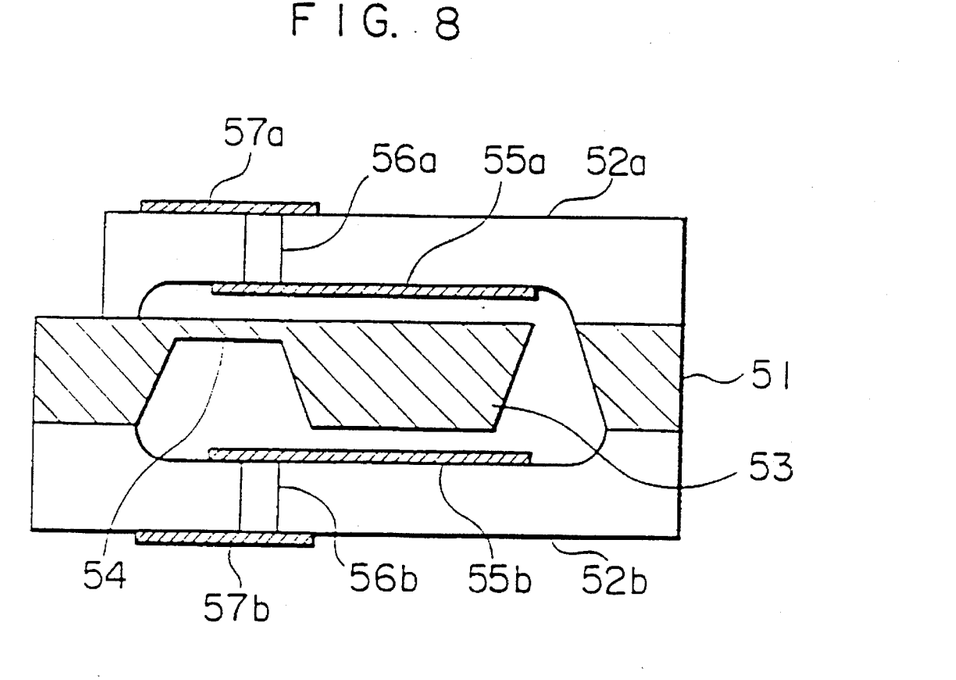
FIGS. 8 to 11 illustrate semiconductor acceleration sensors.
Figure 9:
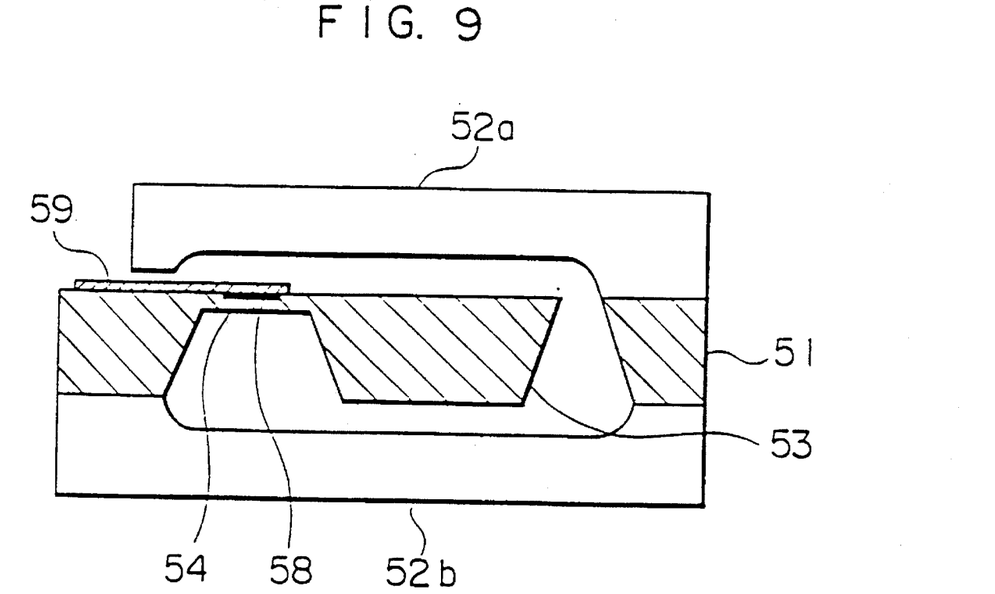

FIGS. 8 and 9 respectively illustrate basic structures of semiconductor acceleration sensors of an electrostatic capacity type and of a piezoelectric resistance type, which are two typical types, the sensors being manufactured by a silicon micromachining technology.

The acceleration sensor is for obtaining an acceleration by a measurement of an inertia force acting on a predetermined mass in the case where the acceleration exists. Each of the acceleration sensors shown in FIGS. 8 and 9 is structured such that a load 53 and a cantilever 54 for supporting the load 53 are formed on an intermediate silicon substrate 51 by anisotropic etching. When an acceleration $\alpha$ is applied, an inertia force ($E_1 = m\alpha$) acts on the load (mass m), causing the load (mass m) to be displaced. On the other hand, the cantilever acts as a spring so that it gives to the load a restoring force expressed by ($F_2 = kx$) (where symbol k denotes a spring constant and x denotes the amount of displacement), the restoring force being given in the direction reverse to the direction of the displacement. As a result, the load is displaced to the position at which the above-described two forces are balanced. From the relationship expressed by ($F_1 = F_2 x$), the displacement x is given by:

$$x = ma/k \tag{I}$$

Therefore, the acceleration $\alpha$ can be obtained from the displacement x.

The electrostatic capacity type acceleration sensor shown in FIG. 8 includes an upper fixed electrode 55b and a lower fixed electrode 55b formed on the surfaces of the upper substrate 52a and the lower substrate 52b which face the intermediate silicon substrate 51. The electrostatic capacity type acceleration sensor acts to measure the acceleration by obtaining the displacement x of the Equation (I) from a variation in the electrostatic capacity between the fixed electrodes and the load (movable electrode).

On the other hand, the piezoelectric resistance type acceleration sensor shown in FIG. 9 is structured such that a gauge portion 58 comprising an impurity diffusion region is formed on the cantilever 54. When the load 53 is displaced by an acceleration, the cantilever 54 is deformed, causing the electric resistance of the gauge portion 58 to be changed by the piezoelectric resistance effect. The displacement can be obtained from the electric resistance of the gauge portion so that the acceleration is obtained.

Thus, an output signal $V(\alpha)$ corresponding to the acceleration can be obtained by a signal processing circuit which processes the electrostatic capacity between the load and the fixed electrode or the electric resistance of the gauge portion. Since the output and the acceleration $\alpha$ are usually processed so as to keep a linear relationship, the output $V(\alpha)$ is expressed by the following equation:

$$V(\alpha) = p\alpha + q \tag{II}$$

It is assumed that the acceleration sensor is changed as time proceeds for some reason. If the change takes place with the linear relationship between the acceleration and the output (substantially) maintained, the output becomes the function of time. Therefore, the output becomes as follows:

$$V(\alpha, t) = p(t)\alpha + q(t) \tag{III}$$

If the range p(t) and the zero point q(t) of the acceleration-output characteristic (III) are known, the acceleration $\alpha$ can be accurately obtained by measuring the output $V(\alpha, t)$.

In the case where p(t) and q(t) are unknown in Equation (III), they can be obtained by generating two different accelerations $\alpha_1$ and $\alpha_2$ by some method so as to measure the outputs $V(\alpha_1, t)$ and $V(\alpha_2, t)$ which correspond to the two accelerations $\alpha_1$ and $\alpha_2$. Namely, p(t) and q(t) can be obtained from the following set of simultaneous equations:

$$\left. \begin{array}{l} V(\alpha_1, t) = p(t)\alpha_1 + q(t) \\ V(\alpha_2, t) = p(t)\alpha_2 + q(t) \end{array} \right\} \tag{IV}$$

On the other hand, the acceleration $\alpha$ corresponds to the displacement x of the load in the relationship given by Equation (I). Therefore, determining the acceleration $\alpha_1$ and $\alpha_2$ becomes equivalent to determining the displacements $x_1$ and $x_2$ which correspond to the accelerations $\alpha_1$ and $\alpha_2$. Thus, the following relationships are obtained from Equations (I) and (IV):

$$\left. \begin{array}{l} V(x_1, t) = p'(t)x_1 + q(t) \\ V(x_2, t) = p'(t)x_2 + q(t) \end{array} \right\} \tag{V}$$

$$\text{where } p'(t) = kp(t)/m \tag{VI}$$

The predetermined displacements $x_1$ and $x_2$ shown in Equation (5) can be relatively easily realized. That is, the structure may be such that the load is forcibly displaced by an actuator and the characteristic of the sensor output $V(x, t)$ sharply varies at the predetermined certain displacements $x_1$ and $x_2$. As an alternative to this, the structure may be such that any further displacement is inhibited.

Figure 10:
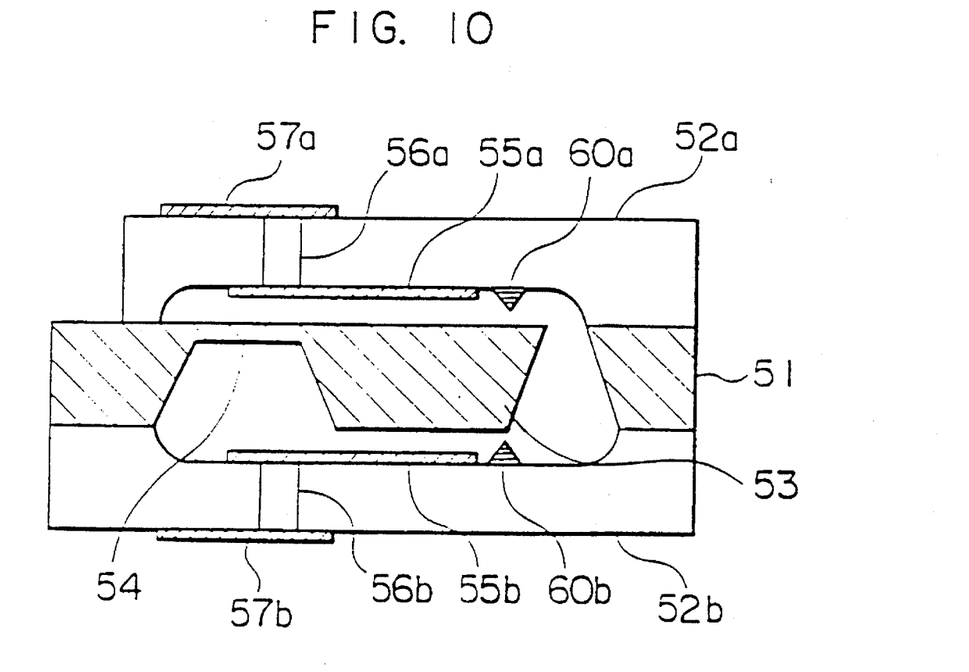
Figure 11:
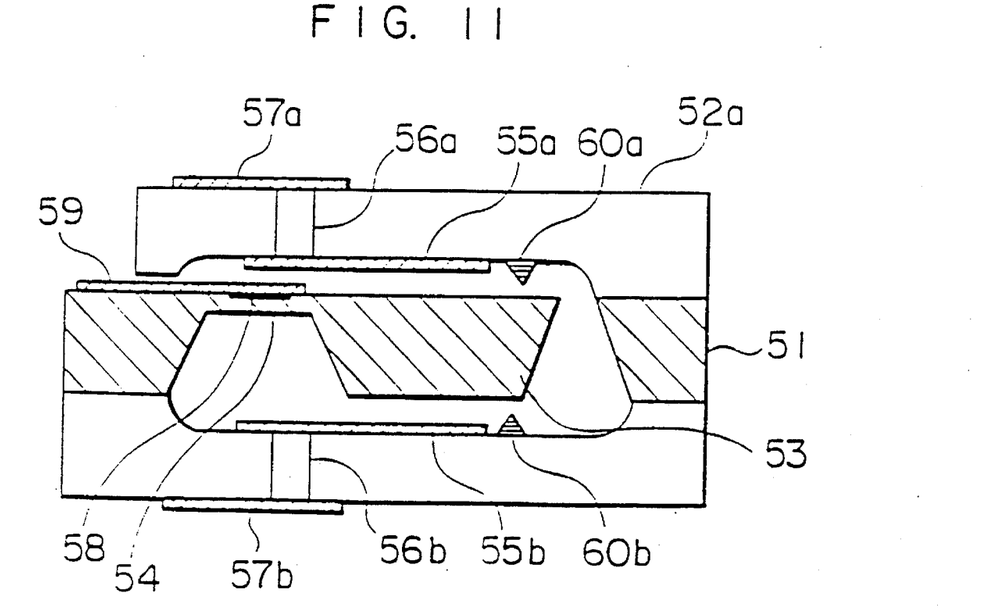

FIGS. 10 and 11 illustrate examples of the above-described structures, in which stoppers 60a and 60b are provided for the purpose of preventing any displacement which exceeds a predetermined degree even if an acceleration or an external force acts on the load. If the displacements $x_1$ and $x_2$ obtained when the loads are brought into contact with the stoppers 60a and 60b are previously know, p(t) and q(t) can be obtained from Equations (V) and (VI) by measuring the outputs $V(x_1, t)$ and $V(x_2, t)$ at this time.

In order to displace the load at a desired time so as to bring it into contact with the stoppers in the case of the electrostatic capacity type sensor, voltage is applied between the load and the upper fixed electrode 55a or the lower fixed electrode 55b, which acts to obtain the electrostatic capacity, so as to apply an electrostatic force between them. Also in the case of the piezoelectric resistance type sensor, the upper fixed electrode 55a and the lower fixed electrode 55b are formed and voltage is applied between the load and the upper fixed electrode 55a or the lower fixed electrode 55b.

As described above, an advantage can be obtained that the change in the acceleration-output characteristic as time proceeds can be corrected by a simple calculation from the output obtained by periodically applying a voltage between the fixed electrodes and the load. Furthermore, the correction can be performed even if an acceleration is being applied to the sensor.

According to the above-described embodiments, the displacement of the load is measured and the acceleration is obtained from the displacement thus measured. A servo type acceleration sensor is also known as a typical acceleration sensor. The servo type acceleration sensor is designed such that the displacement of the load due to an acceleration is measured and a signal representing the displacement is fed back. Furthermore, in response to the signal, the load is given, by some method, a restoring force in the reverse direction in the sensor so that the load is restored to the original position. Since the quantity of the feedback corresponds to the magnitude of the acceleration, the acceleration is obtained from the quantity of the feedback. According to this method, the displacement is substantially constant regardless of the acceleration.

Similarly to the above-described embodiment, the displacement is often measured by the electrostatic capacity method or the piezoelectric resistance method. Furthermore, force is applied to the load in accordance with the quantity of the feedback by using an electrostatic force or a magnetic force.

In the servo type sensor, the relationship between the final output signal and the acceleration is usually expressed by Equation (II). It is assumed that a second force F is applied to the load in addition to the force which corresponds to the quantity of the feedback in the servo system. The output from the sensor at this time can be expressed by the following equation:

$$V(\alpha, F) = p(\alpha + F/m) + q \tag{VII}$$

In the case where forces $F_1$ and $F_2$ of predetermined magnitudes are applied, the following relationships hold:

$$\left. \begin{array}{l} V(\alpha, F_1) = p(\alpha + F_1/m) + q \\ V(\alpha, F_2) = p(\alpha + F_2/m) + q \end{array} \right\} \tag{VIII}$$

Subtracting the lower equation from the upper equation, the following equation can be obtained:

$$V(\alpha, F_1) - V(\alpha, F_2) = p(F_1 - F_2)/m \tag{IX}$$

If $V(\alpha, F_1)$, $V(\alpha, F_2)$, $F_1$, $F_2$ and m are known, p can be obtained.

When the sensor device is positioned upside down by an actuator such as a motor with the application of the force F (F may be 0) maintained, the direction of each of the acceleration and the second force applied to the sensor is inverted. Therefore, the output becomes as follows:

$$V(-\alpha, -F) = p(-\alpha - F/m) + q \tag{X}$$

Adding Equations (VII and X), the following relationship is obtained:

$$V(\alpha, F) + V(-\alpha, -F) = 2q \tag{XI}$$

Therefore, q can be obtained from Equation (XI).

Figure 12:
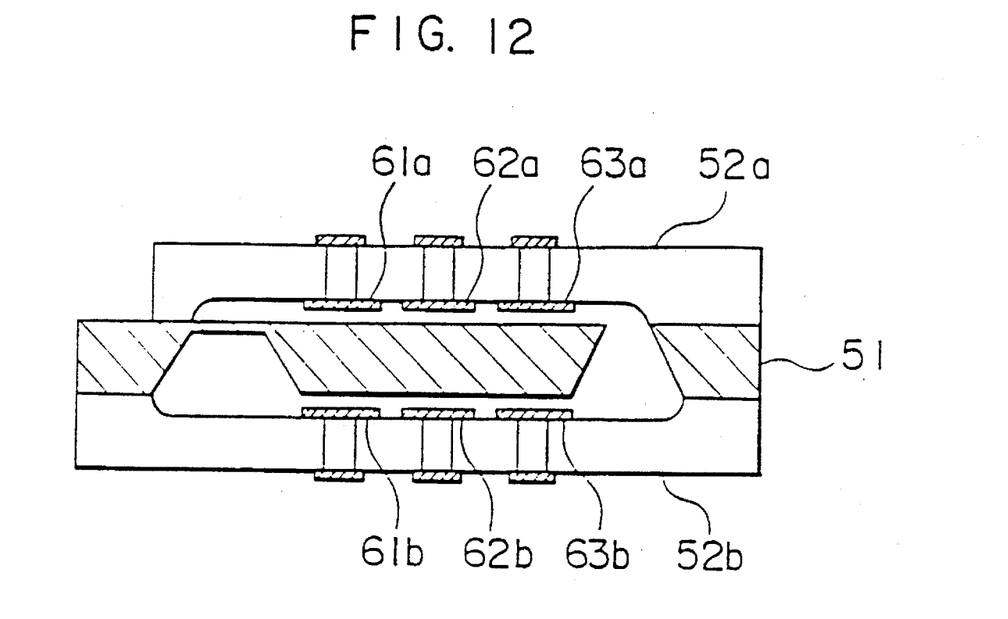
FIGS. 12 and 13 illustrate another embodiment of the acceleration sensor.
Figure 13:
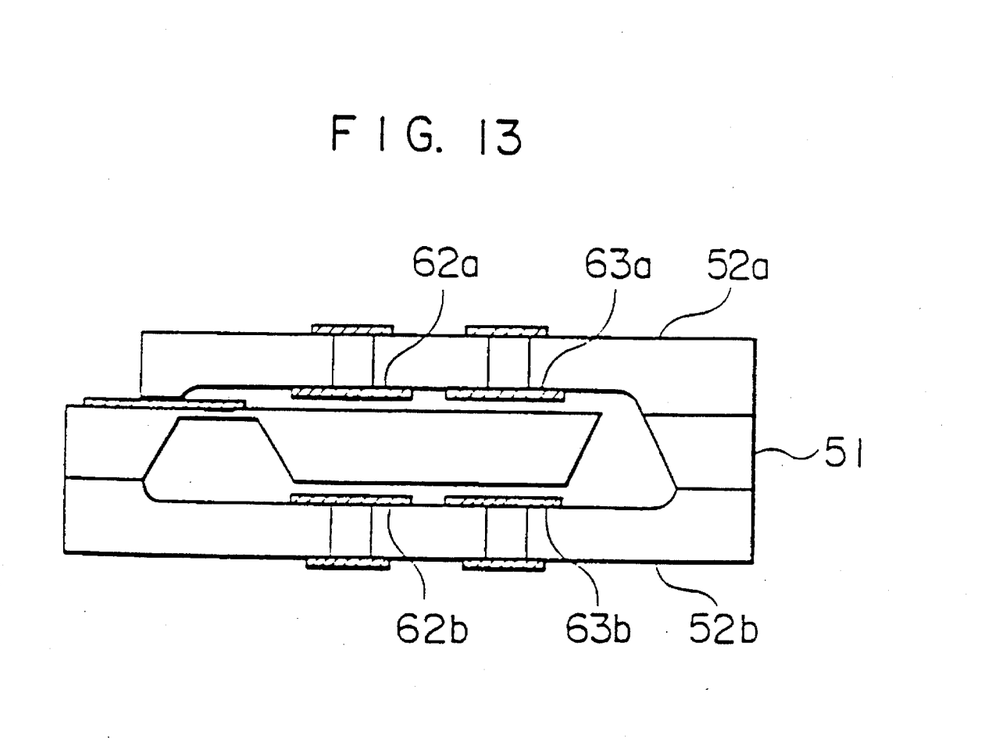

FIGS. 12 and 13 respectively illustrate specific examples of the structures of the sensor devices. FIG. 12 illustrates the structure for measuring a displacement by using the electrostatic capacity, while FIG. 13 illustrates the structure for measuring a displacement by using the piezoelectric resistance device. In each of the two structures, the force according to the quantity of the feedback and the second force are applied to the load by using the electrostatic force for the purpose of forming a servo system. Reference numerals 61a and 61b represent electrodes for detecting the electrostatic capacity which corresponds to the displacement. Reference numerals 62a and 62b represent electrodes for applying the electrostatic force for the servo effect. Reference numerals 63a and 63b represent electrodes for applying the electrostatic force for the purpose of applying the second force to the load. These electrodes can be used in a combined manner by arranging a circuit for the servo system and that for applying the electrostatic force to be of proper structures.

Since the displacement of the load is substantially constant in the servo type sensor, the gap between each of the two electrostatic force applying electrodes 63a and 63b and the load is constant. Therefore, the constant forces $F_1$ and $F_2$ shown in Equation (VIII) can be obtained simply by varying the level of the voltage to be applied to the electrostatic force applying electrodes 63a and 63b. Therefore, the magnitude of each of the forces $F_1$ and $F_2$ can be calculated if the areas of the electrodes, the sizes of the gaps and the level of the voltage to be applied are previously known.

According to the above-described embodiment, an advantage can be obtained that the change in the acceleration output characteristic of the servo type acceleration sensor as time proceeds can be corrected.

Figure 14:
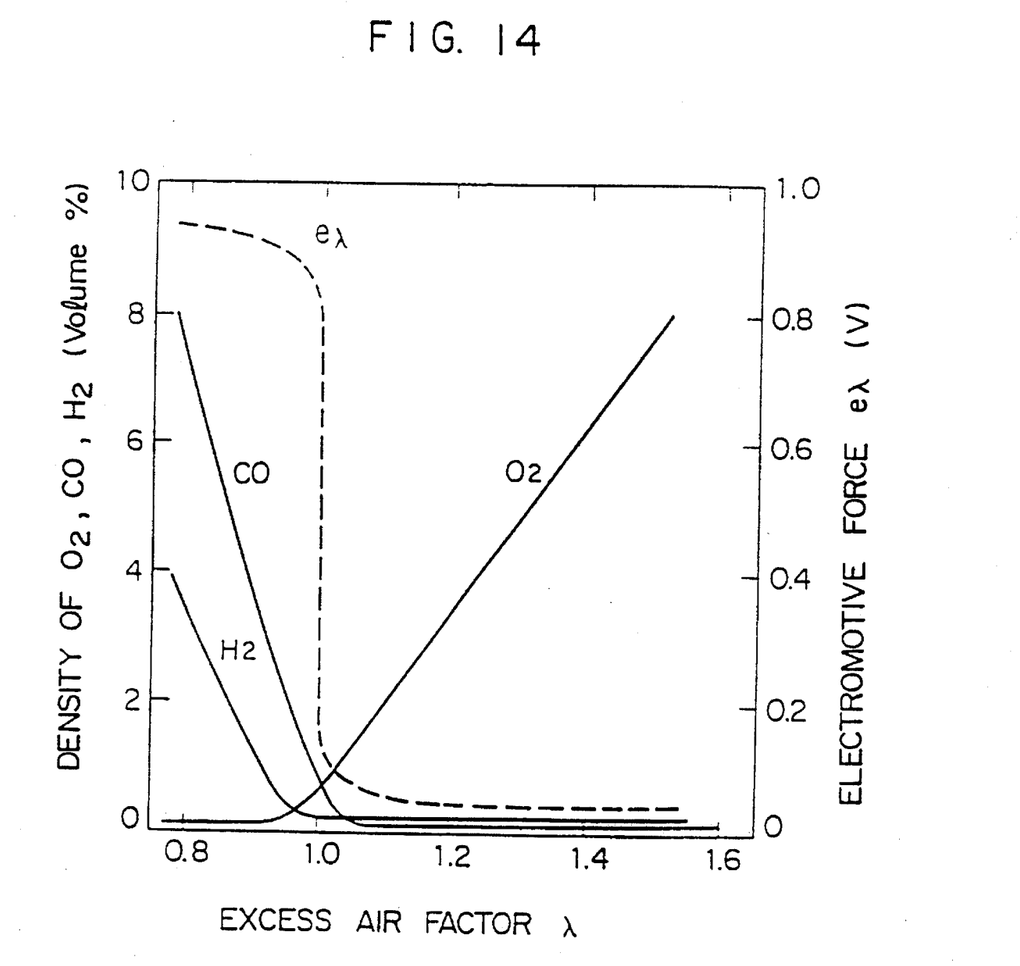
FIG. 14 illustrates the characteristic of an air-fuel ratio sensor with respect to an excess air factor.

Now, an embodiment in which a sensor having a self-diagnosis function is applied to an air-fuel ratio sensor for an automobile will be described below. FIG. 14 illustrates the relationship between an excess air factor λ, the exhaust gas density and the electromotive force. As is well known, the residual oxygen density increases with an increase in the excess air factor λ in the lean region (λ>1), while the density of unburnt gases such as carbon monoxide and hydrogen increases in the rich region ($\lambda<1$) with a decrease in the excess air factor $\lambda$. Hitherto, an $O_2$ sensor utilizing an electromotive force e$\lambda$ having a step-wise output characteristic around the stoichiometrical air-fuel ratio ($\lambda=1$) has been employed as the key sensor for controlling the engine in order to satisfy automobile emission gas regulation. However, the $O_2$ sensor cannot satisfactorily meet the desire of enlarging the output in the rich region and improving the purification of the exhaust gases at the stoichiometrical air-fuel ratio and the economical efficiency in the lean region since the $O_2$ sensor is able to detect only the stoichiometrical air-fuel ratio. Therefore, there has been a demand for an air-fuel ratio sensor capable of continuously and accurately detecting the excess air factor $\lambda$ over a wide range from the rich region to the lean region in order to achieve a most suitable combustion control of the engine. Accordingly, there has been known an air-fuel ratio sensor which utilizes the diffusion controlling phenomenon of the above-described various gas components in a gas diffusion film and the oxygen pump phenomenon of a zirconia solid electrolyte.

Figure 15:
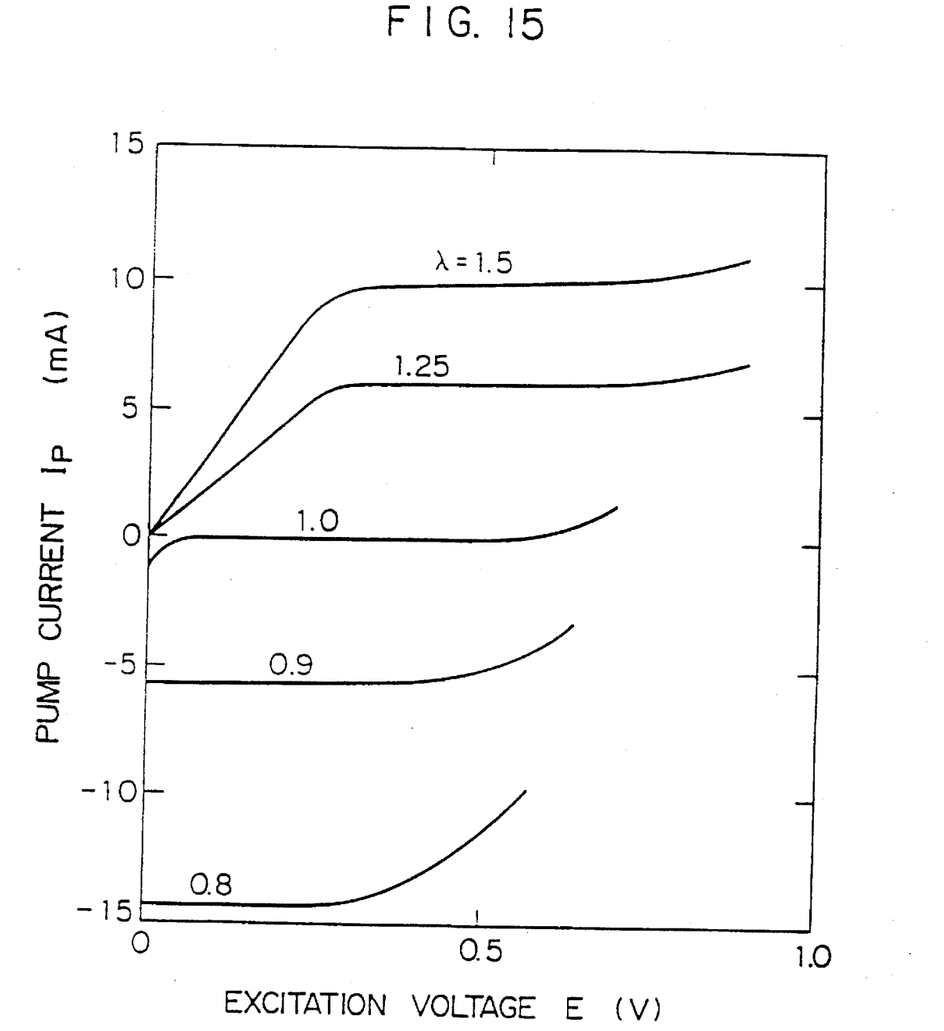
FIG. 15 illustrates the voltage-electric current characteristic of the air-fuel ratio sensor.

FIG. 15 illustrates an example of the V-I characteristics of an air-fuel ratio sensor of the type described above, wherein the relationship between an exciting voltage E applied to a detection portion and a pump electric current $I_P$ passing through the detection portion is shown. As shown in this drawing, the pump electric current $I_P$ exhibits a predetermined value in a certain range of exciting voltage. The predetermined value is a value determined by a diffusion resistance R in the gas diffusion film and the excess air factor $\lambda$, the value being called a "critical current value". The excess air factor $\lambda$ is measured from the level of the critical current value $I_P$.

The diffusion resistance R varies depending upon the adhesion of dust to the gas diffusion film and microcracks formed in the gas diffusion film, causing the critical current value $I_P$ to vary correspondingly. In the case of the adhesion of dust to the gas diffusion film, the critical current value is reduced since the diffusion resistance is increased. On the other hand, the diffusion resistance is reduced in the case of the microcracks, causing the critical current value to be increased. In either of the above-described two cases, the excess air factor $\lambda$ cannot be detected accurately.

Figure 16:
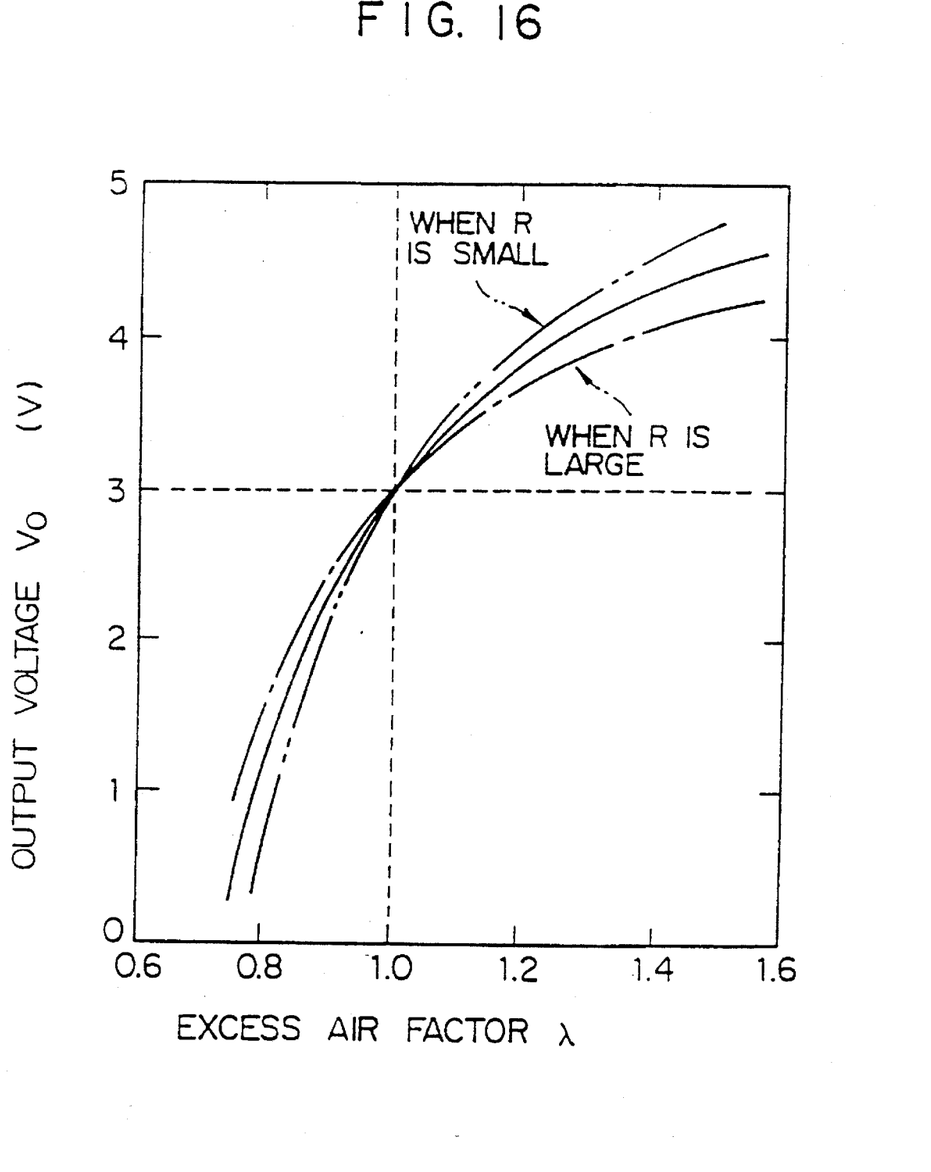
FIG. 16 illustrates the output characteristic of the air-fuel ratio sensor.

FIG. 16 illustrates the characteristic obtained by converting the critical current value which corresponds to the excess air factor $\lambda$ into the output voltage $V_0$. The initial characteristic of the air-fuel ratio sensor is shown in the drawing by a continuous or solid line. The output characteristic obtained when the diffusion resistance R of the gas diffusion apertures has been increased as time proceeds is designated by a one-dot line, while the output characteristic obtained when the diffusion resistance R has been decreased is designated by a two-dot line. As shown in the drawing, the output voltage at the zero point of the air-fuel ratio sensor, that is, at the stoichiometrical air-fuel ratio point ($\lambda=1$), does not vary. The reason for this lies in that the critical current value is, as shown in FIG. 15, zero at the stoichiometrical air-fuel ratio point. The output voltage varies only in the rich region ($\lambda<1$) and the lean region ($\lambda>1$), that is, only the sensitivity of the air-fuel ratio sensor is changed.

Now, an air-fuel ratio sensor having a self-diagnosis function will be described with reference to FIG. 17, the air-fuel ratio sensor being designed such that an amount of a change in a characteristic variable of the sensor caused when a calibrating electric signal is applied is measured and the change in the sensitivity as time proceeds is corrected in accordance with the electric signal and the amount of the change in the characteristic variable of the sensor.

Figure 17:
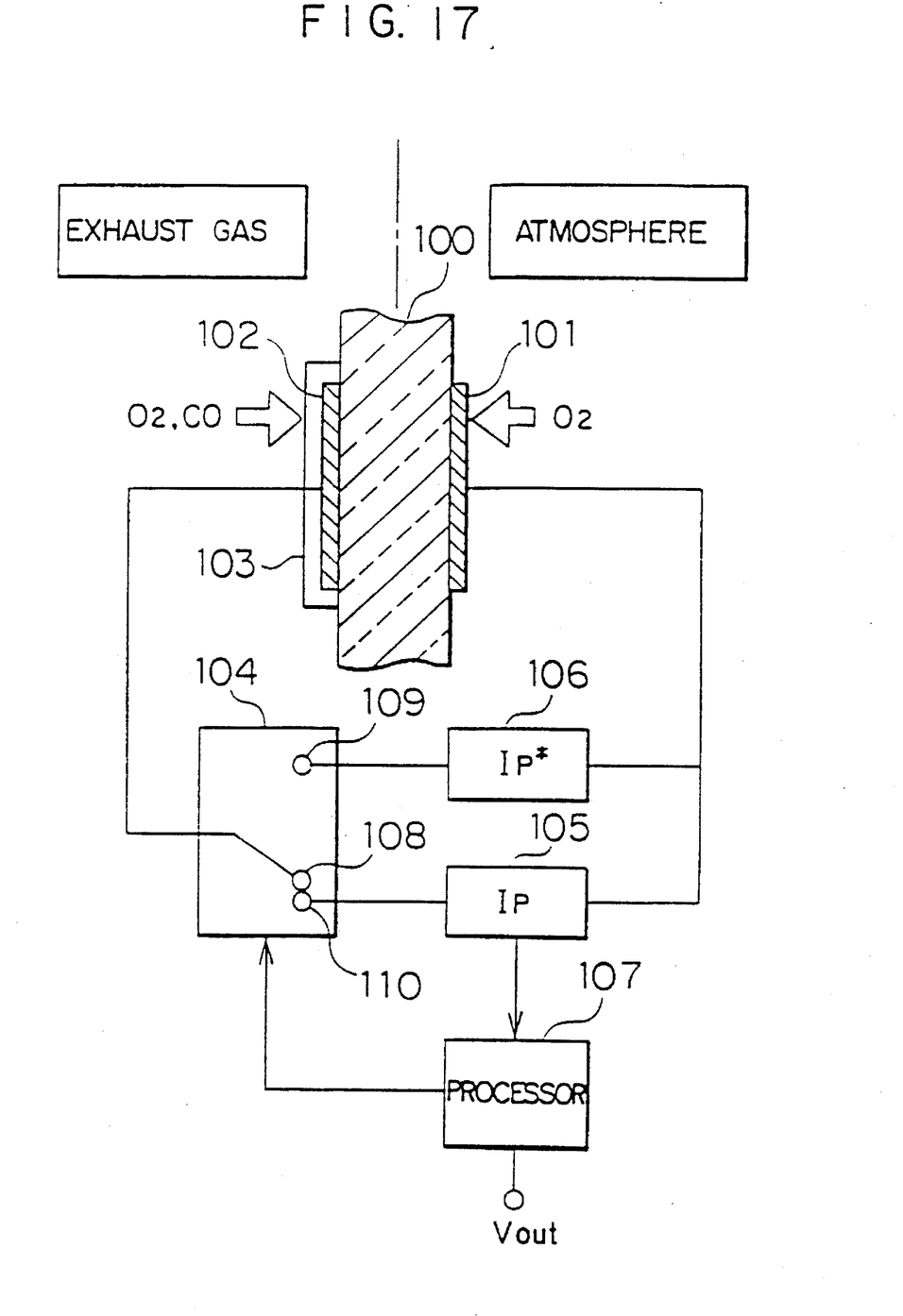
FIG. 17 illustrates the structure of a sensor having a self-diagnosis function.

Referring to FIG. 17, the detection portion of the air-fuel ratio sensor comprises a zirconia solid electrolyte 100, porous electrodes 101 and 102 and a gas diffusion film 103. The zirconia solid electrolyte 100 is of a tubular shape with the porous electrode 101 formed on the inner surface thereof and the porous electrode 102 and the gas diffusion film 103 formed on the outer surface thereof. The porous electrode 101 is exposed to the atmosphere while the porous electrode 102 and the gas diffusion film 103 are exposed to the exhaust gases with the zirconia solid electrolyte 100 acting as a partition wall.

The detection means comprises a switch 104 and a portion 105 for measuring critical current $I_P$, while the stimulating means comprises a portion 106 for supplying a predetermined current $I_P^*$. A processing means 107 has the self-calibration function and preferably comprises a microcomputer. FIG. 17 schematically illustrates that the switch 104 comprises contacts 108, 109 and 110 and is arranged such that the portion 106 for supplying the predetermined current $I_P^*$ is operated when a connection between the contact 108 and the contact 109 is established, and such that when a connection between the contact 108 and the contact 110 is established the portion 105 for measuring the critical current $I_P$ is operated. When no connection is established between the contact 108 and any of the contacts 109 and 110, both the portion 105 for measuring the critical current $I_P$ and the portion 106 for supplying the predetermined current $I_P^*$ are not operated.

The density of the gas contained in the exhaust gases is changed in accordance with the excess air factor $\lambda$. Therefore, the critical current $I_P$ which corresponds to the content of the unburnt gas such as the residual oxygen and the carbon monoxide is measured by the portion 105 for measuring the critical current $I_P$ when the contacts 108 and 110 are connected. The output characteristic of the air-fuel ratio sensor is automatically diagnosed periodically (for example, about every month). That is, if the excess air factor $\lambda$ continuously shows a predetermined value (preferably the stoichiometrical air-fuel ratio $\lambda=1$) for a considerably long time, the self-diagnosis function portion 107 controls the switch 104 so as to establish a connection between the contacts 108 and 109. As a result, the portion 106 for supplying the predetermined current $I_P^*$ is operated. The portion 106 for supplying the predetermined current $I_P^*$ forcibly supplies the calibrating electric signal $I_P^*$ to the detection portion. As a result, oxygen of a predetermined quantity, which corresponds to the predetermined current $I_P^*$, can be supplied from the porous electrode 101, which is exposed to the atmosphere, through the zirconia solid electrolyte 100 to the porous electrode 102, which is exposed to the exhaust gas.

The oxygen thus supplied is discharged into the exhaust gas from the porous electrode 102 through the gas diffusion film 103. Since the rate of discharge of the oxygen is determined depending upon the diffusion resistance R of the gas diffusion film 103, the change in the sensitivity of the air-fuel ratio sensor as the time proceeds can be diagnosed by measuring the change in the content of the oxygen at the interface between the porous electrode 102 and the gas diffusion portion 103. In the case where the diffusion resistance R of the gas diffusion film 103 is large, the rate of discharge of the oxygen is low, while the discharge rate is high when the diffusion resistance R is small.

As described above, the fact that the oxygen discharge rate is lower than the initial one is evidence that the sensitivity of the air-fuel ratio sensor has been deteriorated. On the contrary, the fact that the rate is higher is evidence that the sensitivity has been increased. Immediately after the portion 106 for supplying the predetermined current $I_P^*$ has been operated, the portion 105 for measuring the critical current $I_P$ is intermittently operated in response to a command issued from the self-diagnosis function portion 107. As a result, the change in the oxygen discharge rate as time proceeds (that is, the change in the diffusion resistance R as the time proceeds) is estimated. If the change in the diffusion resistance R as time proceeds is known, an accurate output voltage $V_{out}$ corresponding to the excess air factor λ can be obtained by correcting the sensitivity of the air-fuel ratio sensor by the self-diagnosis function portion 107.

Figure 18:
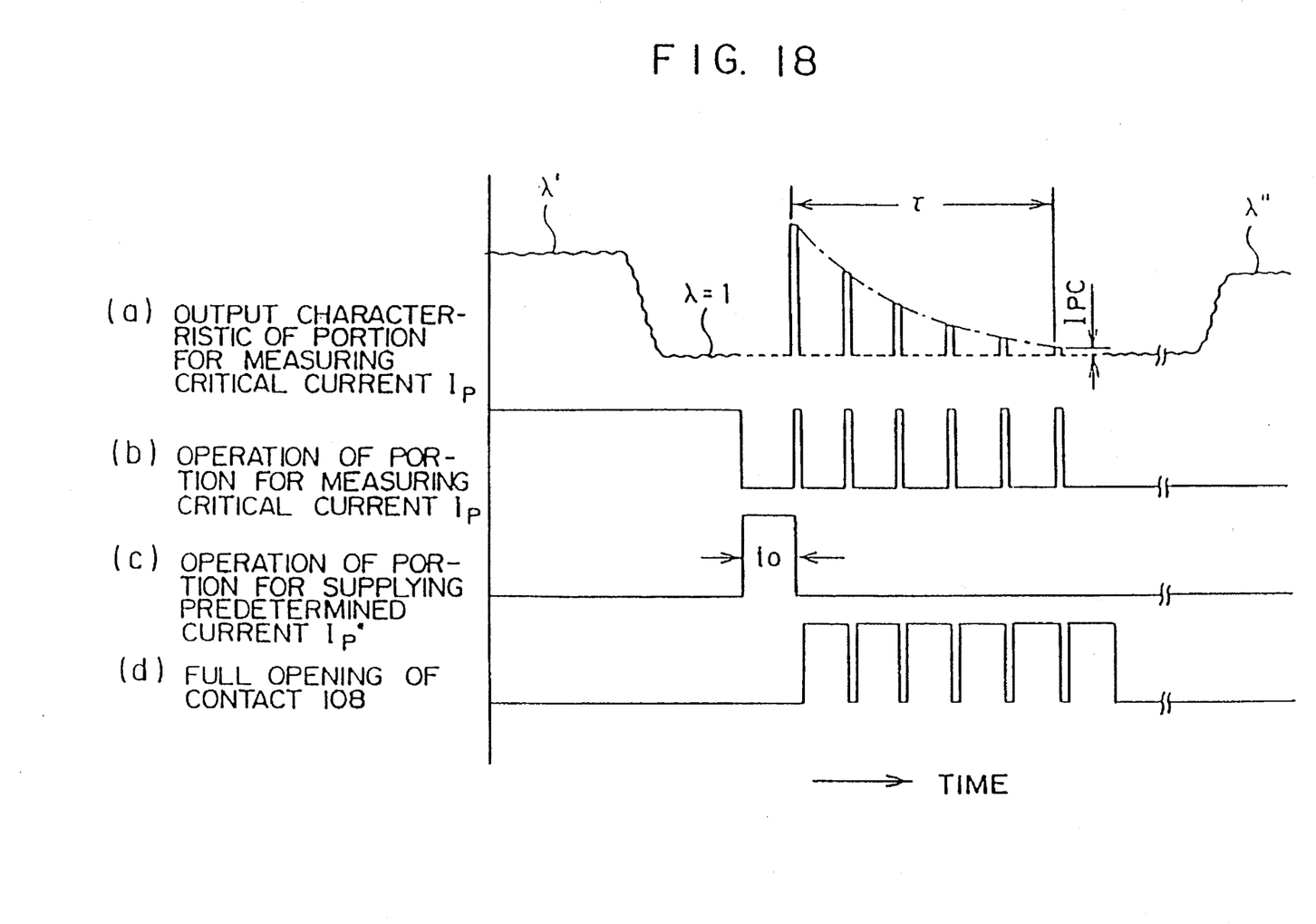
FIG. 18 illustrates the self-diagnosis operation.

Now, a method of diagnosing the change in the diffusion resistance R as time proceeds will be described in detail with reference to FIG. 18. Graph (a) illustrates the output characteristic of the portion 105 for measuring the critical current $I_P$, (b) illustrates the state of the operation of the portion 105 for measuring the critical current $I_P$, (c) illustrates the state of the operation of the portion 106 for supplying the predetermined current $I_P^*$ and (d) illustrates a state in which the contact 108 is fully opened.

As shown in graph (a), the excess air factor λ is controlled from λ' through λ(=1) to λ" in order to realize a proper air-fuel ratio which corresponds to the state in which the automobile is operated. After the operation at the stoichiometrical air-fuel ratio (λ=1) has been continued for a certain time period, the connection of the contact 108 in the switch 104 is changed from the contact 110 to the contact 109. As a result, the portion 106 for supplying the predetermined current $I_P^*$ is operated for a certain time (to) so that oxygen of a predetermined quantity is forcibly supplied from the porous electrode 101 to the porous electrode 102. Then, the portion 105 for measuring the critical current $I_P$ is intermittently operated so as to detect the change in the critical current $I_P$ caused in the detection portion. The current $I_P$ detected is gradually decreased as shown by a one-dot line in graph (a). It takes a time τ for the current $I_P$ to be lowered to a predetermined level $I_{PC}$. The reason for the decrease in the level of the current $I_P$ lies in that oxygen at the interface between the porous electrode 102 and the gas diffusion film 103 is discharged into the exhaust gas, causing the density of the oxygen at the interface to be lowered gradually.

When the diffusion resistance R of the gas diffusion film 103 is reduced, the above-described time τ becomes shorter than an initial value τ0. On the contrary, when the diffusion resistance has been increased, the time τ becomes larger than the initial value τ0. Therefore, the self-diagnosis function portion 107 performs the switching correction in such a manner that the sensitivity of the air-fuel ratio sensor is decreased in the former case, while the same is improved in the latter case. As a result, an accurate output voltage $V_{OUT}$ can always be obtained.

As described above, the change in the sensitivity as time proceeds can be corrected in accordance with the amount of the change in the characteristic variable ($I_P$) of the air-fuel ratio sensor which is caused due to the calibrating electric signal ($I_P^*$) applied.

According to the present invention, the calibration operation can be performed in addition to the measuring operation. Therefore, an accurate output can be detected continuously.

What is claimed is:

1. An acceleration sensing system comprising:

a detection section for detecting a displacement of a movable portion displaceable according to an acceleration;

exciting means for applying an exciting signal to the movable portion;

signal processing means for giving the exciting means a command signal for the exciting signal in response to a command signal received from outside the signal processing means, and receiving a response signal in accordance with the displacement of the movable portion caused by the exciting signal;

memory means storing data concerning an initial characteristic for the exciting signal; and a communication device disposed outside the signal processing means for transmitting to the signal processing means a command signal for causing the signal processing means to give the exciting means the command signal for the exciting signal;

wherein the signal processing means is operative to compare the initial characteristic data with the response signal.

2. An acceleration sensing system according to claim 1, wherein the data stored in the memory means is updated in accordance with the result of the comparison.

3. An acceleration sensing system according to claim 1, wherein the detection section detects a variation in an electrostatic capacity.

4. An acceleration sensing system according to claim 1, wherein the detection section detects a variation in a piezoelectric resistance.

5. A method of sensing an acceleration, comprising the steps of:

detecting a displacement of a movable portion caused by an acceleration;

applying an exciting signal to the movable portion;

giving an exciting means a command signal for the exciting signal;

obtaining a response signal in accordance with the displacement of the movable portion caused by the exciting signal;

storing data concerning an initial characteristic for the exciting signal; and comparing the initial characteristic data with the response signal;

wherein the command signal for the exciting signal is given to the exciting means by signal processing means in response to a command signal transmitted to the signal processing means by a communication device disposed outside the signal processing means.

6. An acceleration sensing method according to claim 5, wherein the data stored is updated in accordance with the result of the comparison.

7. An acceleration sensing method according to claim 5, wherein the detecting step is carried out by detecting a variation in an electrostatic capacity.

8. An acceleration sensing method according to claim 5, wherein the detecting step is carried out by detecting a variation in a piezoelectric resistance.

9. An acceleration sensing system comprising:

a movable portion which undergoes a displacement in response to an acceleration or an exciting signal applied thereto;

detecting means for detecting the displacement of the movable portion, and generating an output signal indicative of the displacement of the movable portion;

exciting means for applying an exciting signal to the movable portion, thereby producing a displacement of the movable portion and causing the detecting means to generate an output signal indicative of the displacement of the movable portion produced by the exciting signal;

memory means for storing initial characteristic data relating to an initial acceleration/output signal characteristic;

signal processing means for
controlling the exciting means to apply the exciting signal to the movable portion in response to a command signal received from outside the signal processing means,
receiving the output signal indicative of the displacement of the movable portion produced by the exciting signal,
calculating current characteristic data indicative of a current acceleration/output signal characteristic based on the output signal indicative of the displacement of the movable portion produced by the exciting signal, and
calculating calibration data based on the current characteristic data and the initial characteristic data, the calibration data being for use in calibrating an output signal of the detecting means generated when the movable portion undergoes a displacement in response to an acceleration; and a communication device disposed outside the signal processing means for transmitting to the signal processing means a command signal for causing the signal processing means to control the exciting means to apply the exciting signal to the movable portion.

10. An acceleration sensing system according to claim 9, wherein the memory means also stores the calibration data; and wherein the signal processing means updates the calibration data stored in the memory means each time the calibration data is calculated.

11. An acceleration sensing system according to claim 9, wherein the detecting means detects a change in an electrostatic capacity which occurs as a result of the displacement of the movable portion.

12. An acceleration sensing system according to claim 9, wherein the detecting means detects a change in a piezoelectric resistance which occurs as a result of the displacement of the movable portion.

13. A method of sensing acceleration, comprising the steps of:

providing a movable portion which undergoes a displacement in response to an acceleration or an exciting signal applied thereto;

transmitting a command signal to signal processing means from a communication device disposed outside the signal processing means;

causing the signal processing means, in response to the command signal transmitted to the signal processing means from the communication device, to control exciting means to apply an exciting signal to the movable portion, thereby producing a displacement of the movable portion;

detecting the displacement of the movable portion produced by the exciting signal;

generating an output signal indicative of the displacement of the movable portion produced by the exciting signal;

storing initial characteristic data relating to an initial acceleration/output signal characteristic;

calculating current characteristic data indicative of a current acceleration/output signal characteristic based on the output signal indicative of the displacement of the movable portion produced by the exciting signal; and calculating calibration data based on the current characteristic data and the initial characteristic data, the calibration data being for use in calibrating an output signal to be generated when the movable portion undergoes a displacement in response to an acceleration.

14. An acceleration sensing method according to claim 13, further comprising the steps of:

storing the calibration data; and updating the stored calibration data each time the calibration data is calculated.

15. An acceleration sensing method according to claim 13, wherein the detecting step includes the step of detecting a change in an electrostatic capacity which occurs as a result of the displacement of the movable portion.

16. An acceleration sensing method according to claim 13, wherein the detecting step includes the step of detecting a change in a piezoelectric resistance which occurs as a result of the displacement of the movable portion.

\* \* \* \* \*